US010592935B2

(12) United States Patent
Albisu et al.

(10) Patent No.: US 10,592,935 B2
(45) Date of Patent: Mar. 17, 2020

(54) METHODS, SYSTEMS, AND COMPUTER-READABLE STORAGE DEVICES FACILITATING ANALYSIS OF RECORDED EVENTS

(71) Applicant: AT&T Intellectual Property I, L.P., Atlanta, GA (US)

(72) Inventors: Luis Albisu, Fairfax Station, VA (US); Joseph Bentfield, Waukesha, WI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1046 days.

(21) Appl. No.: 14/501,458

(22) Filed: Sep. 30, 2014

(65) Prior Publication Data
US 2015/0019446 A1    Jan. 15, 2015

Related U.S. Application Data

(63) Continuation of application No. 13/161,556, filed on Jun. 16, 2011, now Pat. No. 8,849,686.

(51) Int. Cl.
*G06Q 30/02* (2012.01)
*G06Q 30/00* (2012.01)
(Continued)

(52) U.S. Cl.
CPC ......... *G06Q 30/0281* (2013.01); *G06F 16/68* (2019.01); *G06Q 10/10* (2013.01); *G06Q 30/016* (2013.01); *G06Q 30/06* (2013.01)

(58) Field of Classification Search
None
See application file for complete search history.

(56) References Cited

U.S. PATENT DOCUMENTS 5,563,607 A * 10/1996 Loomis .................. G01S 19/07
                                                    342/357.44
5,675,511 A    10/1997 Prasad et al.
(Continued)

FOREIGN PATENT DOCUMENTS

WO    WO-9811520 A1 *  3/1998  ........... G07G 1/0054
WO    WO-2005034424 A1 *  4/2005  ............ G06Q 20/02
(Continued)

OTHER PUBLICATIONS

Basescu, Cristina, et al. "Managing data access on clouds: A generic framework for enforcing security policies." 2011 IEEE International Conference on Advanced Information Networking and Applications. IEEE, 2011. (Year: 2011).*

(Continued)

*Primary Examiner* — Matthew S Gart
*Assistant Examiner* — Derick J Holzmacher
(74) *Attorney, Agent, or Firm* — Hartman & Citrin LLC

(57) ABSTRACT

An event recording is received. The event is associated with an event entity and occurs over an event duration at an event location. A tag is received responsive to user interaction with a communication device. The tag is associated with at least one of the particular entity associated with the event entity, a particular time period associated with the event duration, and a particular location associated with the event location. Additional information associated with the event recording is received, and the tag is matched with at least a portion of the event recording based on at least one of the particular entity, the particular time period, and the particular location associated with the received tag. The portion of the event recording matching the received tag is presented for review along with the received additional information associated with the event recording.

19 Claims, 4 Drawing Sheets

(51) Int. Cl.
*G06Q 30/06* (2012.01)
*G06Q 10/10* (2012.01)
*G06F 16/68* (2019.01)

(56) References Cited

U.S. PATENT DOCUMENTS

| | | | | |
|---|---|---|---|---|
| 5,745,036 | A * | 4/1998 | Clare | G07G 1/0054 235/375 |
| 7,630,737 | B2 | 12/2009 | Pande et al. | |
| 7,644,096 | B2 | 1/2010 | Sjolander | |
| 7,707,239 | B2 | 4/2010 | Anderson et al. | |
| 2002/0087882 | A1 * | 7/2002 | Schneier | G06F 21/552 726/23 |
| 2002/0099609 | A1 * | 7/2002 | Nascenzi | G06Q 20/202 705/21 |
| 2002/0131511 | A1 * | 9/2002 | Zenoni | G07C 9/00158 375/240.28 |
| 2003/0025599 | A1 | 2/2003 | Monroe | |
| 2003/0040925 | A1 * | 2/2003 | Gutta | G08B 13/19602 348/143 |
| 2006/0170565 | A1 | 8/2006 | Husak et al. | |
| 2007/0217761 | A1 | 9/2007 | Chen et al. | |
| 2007/0233708 | A1 * | 10/2007 | Baio | G06Q 10/10 |
| 2008/0039121 | A1 * | 2/2008 | Muller | H04M 7/0036 455/456.3 |
| 2008/0126366 | A1 * | 5/2008 | Malik | G06F 16/48 |
| 2008/0195664 | A1 * | 8/2008 | Maharajh | G06Q 10/10 |
| 2008/0218591 | A1 * | 9/2008 | Heier | G06Q 20/20 348/150 |
| 2009/0106362 | A1 | 4/2009 | Kuhike et al. | |
| 2009/0112683 | A1 * | 4/2009 | Hamilton, II | G06Q 30/02 705/7.32 |
| 2009/0144391 | A1 * | 6/2009 | Jung | G06Q 10/10 709/217 |
| 2009/0212915 | A1 | 8/2009 | Ulirch | |
| 2009/0228492 | A1 * | 9/2009 | Valdez | G06F 16/48 |
| 2009/0248833 | A1 * | 10/2009 | Frazier | H04L 67/18 709/217 |
| 2009/0300685 | A1 * | 12/2009 | Easter | H04N 7/147 725/62 |
| 2010/0036670 | A1 * | 2/2010 | Hill | H04M 3/523 705/304 |
| 2010/0153465 | A1 * | 6/2010 | Dasgupta | G06K 9/00624 707/802 |
| 2010/0250131 | A1 * | 9/2010 | Relyea | G01C 21/20 701/469 |
| 2010/0316199 | A1 * | 12/2010 | Martin, II | H04M 3/42221 379/88.08 |
| 2011/0055927 | A1 * | 3/2011 | Hamilton, II | G06F 3/011 726/26 |
| 2011/0068906 | A1 * | 3/2011 | Shafer | G06K 7/0008 340/10.3 |
| 2011/0080264 | A1 * | 4/2011 | Clare | G01S 13/82 340/10.1 |
| 2011/0113119 | A1 * | 5/2011 | Frazier | G06F 17/30041 709/217 |
| 2011/0136502 | A1 * | 6/2011 | Hubner | H04W 4/02 455/456.1 |
| 2011/0184937 | A1 * | 7/2011 | Jin | G06Q 10/107 707/722 |
| 2012/0076367 | A1 | 3/2012 | Tseng | |
| 2012/0259842 | A1 | 10/2012 | Oman et al. | |
| 2013/0041759 | A1 * | 2/2013 | Mikan | G06Q 30/0269 705/14.66 |
| 2013/0110565 | A1 * | 5/2013 | Means, Jr. | G06Q 10/06 705/7.11 |
| 2013/0160074 | A1 * | 6/2013 | Kang | G06F 21/00 726/1 |
| 2013/0331131 | A1 * | 12/2013 | Fix | H04W 4/029 455/457 |
| 2014/0156538 | A1 * | 6/2014 | Kandasamy | G06Q 30/016 705/304 |
| 2015/0269586 | A1 * | 9/2015 | Garia | G06Q 30/016 705/304 |
| 2016/0148218 | A1 * | 5/2016 | Koch | G06Q 30/0201 705/7.29 |

FOREIGN PATENT DOCUMENTS

| | | | | |
|---|---|---|---|---|
| WO | WO-2007062176 | A2 * | 5/2007 | G06Q 10/10 |
| WO | WO-2009081146 | A1 * | 7/2009 | G06Q 10/06 |
| WO | WO-2010094983 | A1 * | 8/2010 | G06Q 10/00 |

OTHER PUBLICATIONS

Zuo, Yanjun. "Survivable Rfid systems: Issues, challenges, and techniques." IEEE Transactions on Systems, Man, and Cybernetics, Part C (Applications and Reviews) 40.4 (2010): 406-418. (Year: 2010).*

Sekar, M. Raja, et al. "A real time surveillance system using wired and wireless sensor networks by multi-algorithmic approach." 2011 International Conference on Digital Image Computing: Techniques and Applications. IEEE, 2011. (Year: 2011).*

Liao, Yi-Pin, and Chih-Ming Hsiao. "A secure ECC-based RFID authentication scheme integrated with ID-verifier transfer protocol." Ad Hoc Networks 18 (2014): 133-146. (Year: 2014).*

Owyoung, Palmer, "How to Hook Up a Security System Using a Mobile Phone", www.ehow.com (Nov. 29, 2010).

USNO NTP Network Time Servers, http://tycho.usno.navy.mil/ntp.html.

NIST Internet Time Servers, http://tf.nist.gov/tf-cgl/servers.cgi.

* cited by examiner

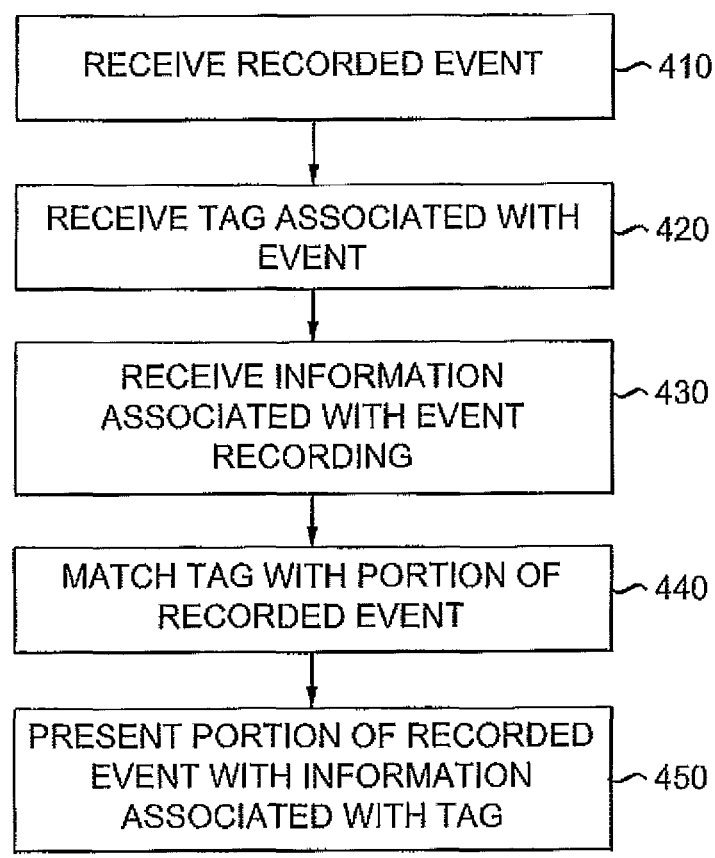

1

METHODS, SYSTEMS, AND COMPUTER-READABLE STORAGE DEVICES FACILITATING ANALYSIS OF RECORDED EVENTS

CROSS-REFERENCE TO RELATED APPLICATIONS

This application is a continuation of U.S. patent application Ser. No. 13/161,556, entitled "Methods, Devices, and Computer Program Products for Associating a Tag with a Recorded Event," filed Jun. 16, 2011, now U.S. Pat. No. 8,849,686.

TECHNICAL FIELD

The present disclosure relates generally to event recording, and, more particularly, to tagging a recorded event.

BACKGROUND

In an environment, such as a retail store, events occur which are often hard to recall with accuracy. If, for example, a customer is dissatisfied with customer service received during a retail transaction, the customer may need to contact a manager or supervisor and relay what occurred during the retail transaction. Though some record of the retail transaction may exist, often the details of the transaction about which the customer is concerned are lost or difficult to find. Also, the time it takes for the customer to recount what occurred during the transaction may lead to frustration. Further, many customers may be reluctant to report a customer service issue and, instead, simply avoid doing business with the retail establishment in the future.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an exemplary embodiment, a method for associating a tag with a recording of an event includes receiving a recording of the event. The event is associated with an event entity and occurs over an event duration at an event location. The method further includes receiving the tag from a communication device responsive to user interaction with the communication device. The tag is associated with at least one of the particular entity associated with the event entity, a particular time period associated with the event duration, and a particular location associated with the event location. The method further includes receiving additional information associated with the event recording, matching the received tag with at least a portion of the event recording based on at least one of the particular entity, the particular time period, and the particular location associated with the received tag, and presenting for review at least the portion of the event recording matching the received tag. The matched portion of the event recording is presented with the received additional information associated with the event recording.

According to another embodiment, a device for associating a tag with a recording of an event includes a receiver configured to receive the recording of the event. The event is associated with an event entity and occurs over an event duration at an event location. The receiver is further configured to receive the tag from a communication device responsive to user interaction with the communication device. The tag is associated with at least one of the particular entity associated with the event entity, a particular time period associated with the event duration, and a particular location associated with the event location. The receiver is further configured to receive additional information associated with the event recording. The device also includes a processor configured to match the received tag with at least a portion of the event recording based on at least one of the particular entity, the particular time period, and the particular location associated with the received tag. The device further includes an output configured to present for review at least the portion of the event recording matching the received tag. The matched portion of the event recording is presented with the received additional information associated with the event recording.

According to another embodiment, a computer program product includes a storage medium upon which instructions are recorded that, when executed by a processor, perform acts for associating a tag with a recording of an event. The acts include receiving the recording of the event. The event is associated with an event entity and occurs over an event duration at an event location. The acts further include receiving the tag from a communication device responsive to user interaction with the communication device. The tag is associated with at least one of the particular entity associated with the event entity, a particular time period associated with the event duration, and a particular location associated with the event location. The acts further include receiving additional information associated with the event recording, matching the received tag with at least a portion of the event recording based on at least one of the particular entity, the particular time period, and the particular location associated with the received tag, and presenting for review at least the portion of the event recording matching the received tag. The matched portion of the event recording is presented with the received additional information associated with the event recording.

BRIEF DESCRIPTION OF THE DRAWINGS

FIG. 4 illustrates a method for associating a tag with a recorded event according to an exemplary embodiment.

DETAILED DESCRIPTION

Detailed exemplary embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

Figure 1:
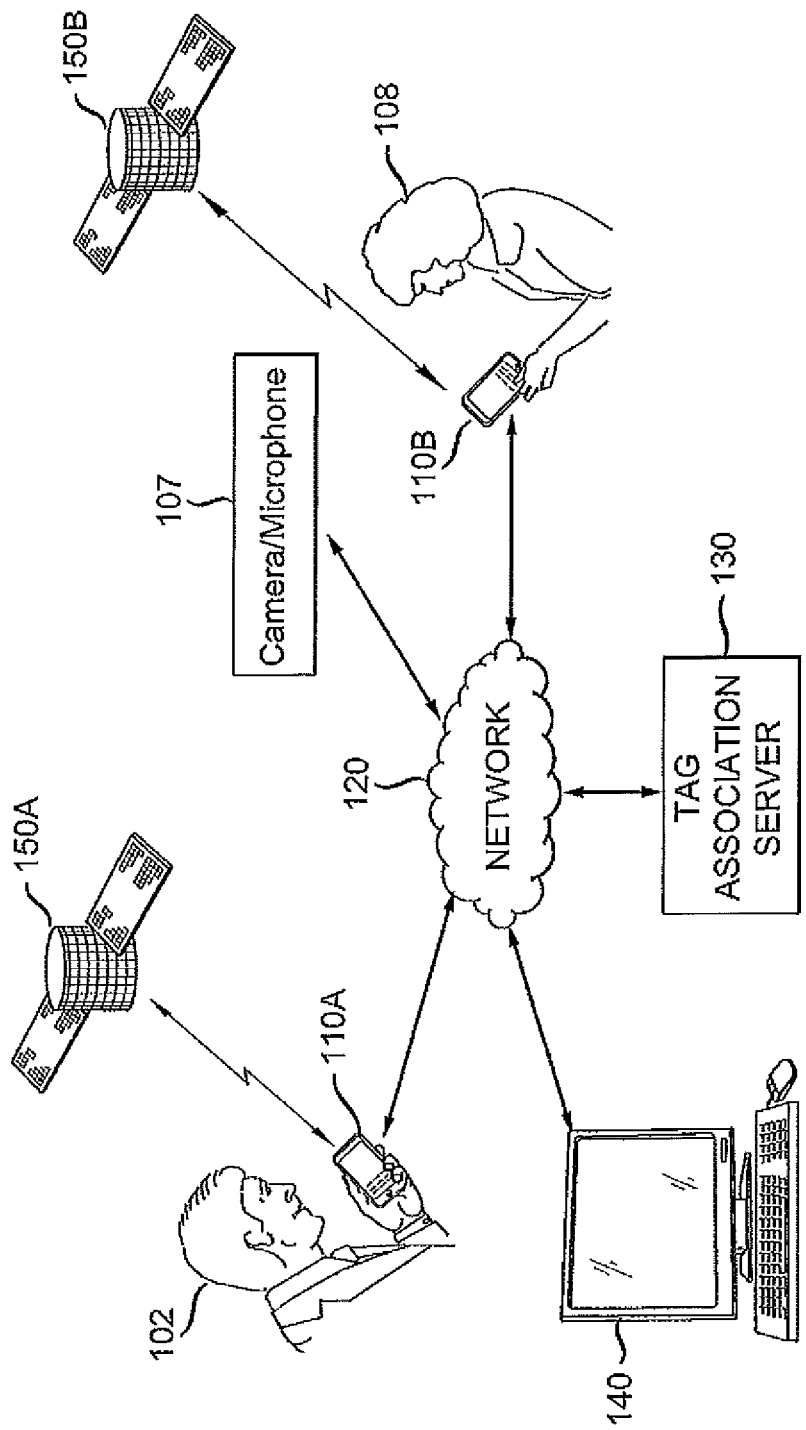
FIG. 1 illustrates an exemplary system for associating a tag with a recorded event according to an exemplary embodiment.

FIG. 1 illustrates an exemplary system for associating a tag with an event according to an exemplary embodiment. In the system shown in FIG. 1, one or more communication devices 110A and 110B communicate with a tag association server 130 via a network 120. The information communicated by the devices 110A and 110B to the tag association server 130 may include tags related to events experienced by users 102 and 108, respectively. The events may include audio and/or video data which may be recorded by a stand-alone camera/microphone 107, e.g., a surveillance camera in an environment such as a retail establishment. In addition or as an alternative, the events may be recorded by the communication devices 110A and 110B. The recorded events are communicated to the tag association server 130 via the network 120.

According to an exemplary embodiment, the tags are initiated and communicated responsive to user input at the communication devices 110A and 110B. According to an exemplary embodiment, the tags each include at least one timestamp generated, e.g., by the respective communication devices 110A and 110B, and information regarding a respective location of the communication devices 110A and 110B. The timestamp is indicative of a time period associated with the event duration, e.g., during the event duration and/or preceding or following the event duration, and the location information is indicative of a location at which the event occurs. The location information may be obtained via a location system, e.g., GPS satellites 150A and 150B. The location information may correspond to the location of a communication device communicating a tag, which may be the same as the event location or within a proximity to the event location.

According to an exemplary embodiment, the timestamp may be made non-refutable to avoid scrutiny as to when an event was recorded. Those skilled in the art will appreciate that this may be accomplished by synchronizing a timer used, e.g., by the communication devices 110A and 110B for generating the timestamps, with a standardized clock. Further details regarding such synchronization are provided online at USNO NTP Network Time Servers and NIST Internet Time Servers.

In addition to including timestamp and location information, the tag may include information indicative of an event entity, e.g., a business or organization at which an event is recorded. The tag may even include information regarding a particular recording device, e.g., camera/microphone 107 that records an event.

In addition to communicating tags, the communication devices 110A and 110B communicate to the tag association server 130 information associated with the recorded events, input, e.g., by at least one of the users 102 and 108, respectively, via a keypad, touchscreen, etc., as described with reference to FIG. 2. The information relates to portions of the events experienced by at least one of the users 102 and 108. For example, for a user who is a customer, the information entered and communicated may include comments regarding a customer transaction. For a user who is a security person, the information may include a security alert or alarm. According to an exemplary embodiment, the additional information associated with the recorded event is communicated separately from the tag. However, it should be appreciated that the additional information may be included as part of the tag.

The tags and associated information may be communicated to the tag association server 130 via, e.g., SMS, MMS, email, etc. The tag association server 130, in turn, matches the tags with a particular time period, e.g., during an event duration and presents for the review a portion of the event recording corresponding to the matched particular time period during the event duration. For example, the tag may include a time stamp indicating a beginning of a portion of an event or any other point during the event. The time period matched may include an amount of time before and after the actual time stamp included in the tag. Alternatively, the tag may include multiple time stamps, e.g., time stamps indicating a beginning of a portion of the event and an end of a portion of the event. In this situation, the time period matched may include the time period between the beginning time stamp and the ending time stamp.

In addition or as an alternative, the tag association server 130 matches the tags with particular locations associated with event locations and/or particular entities located with event entities.

The tagged event portion may be presented, along with additional information associated with the event, for review via the network 120 to a communication device 140. The communication device 140 may be used, e.g., by a manager to review a customer transaction and/or by a security entity (public and/or private) to review a portion of an event having a security concern, e.g., an event involving an emergency.

The communication devices 110A and 110B may be implemented as mobile communication devices, such as the device 110 described in detail below with reference to FIG. 2. Alternatively, one or more of the communication devices 110A and 110B may be implemented with a personal computing device or other communication device. The communication device 140 may be implemented in a manner similar to the devices 110A and 110B. Although three communication devices 110A, 110B, and 140 are shown in FIG. 1 for illustrative purposes, it should be appreciated that any number of communication devices may exchange information in the manner set forth in this disclosure. Moreover, although two GPS satellites 150A and 150B are illustrated, any number of location devices may be used. The tag association server 130 may be implemented with a device such as the device 300 described in further detail below with reference to FIG. 3.

According to an exemplary embodiment, the network 120 may be implemented with one or more wireless networks that use exemplary telecommunications standards, such as Global System for Mobile communications (GSM) and Universal Mobile Telecommunications Systems (UMTS). It should be understood, however, that the embodiments may be implemented in wireless networks that use any existing or yet to be developed telecommunications technology. Some examples of other suitable telecommunication technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to General Packet Radio Service (GPRS), Enhanced Data rates for Global Evolution (EDGE), the High-Speed Packet Access (HSDPA) protocol family, such as High-Speed Downlink Packet Access (HSDPA), Enhanced Uplink (EUL) or otherwise termed High-Speed Uplink Packet Access (HSUPA), Evolved HSPA (HSPA+) and various other current and future data bearers.

Figure 2:
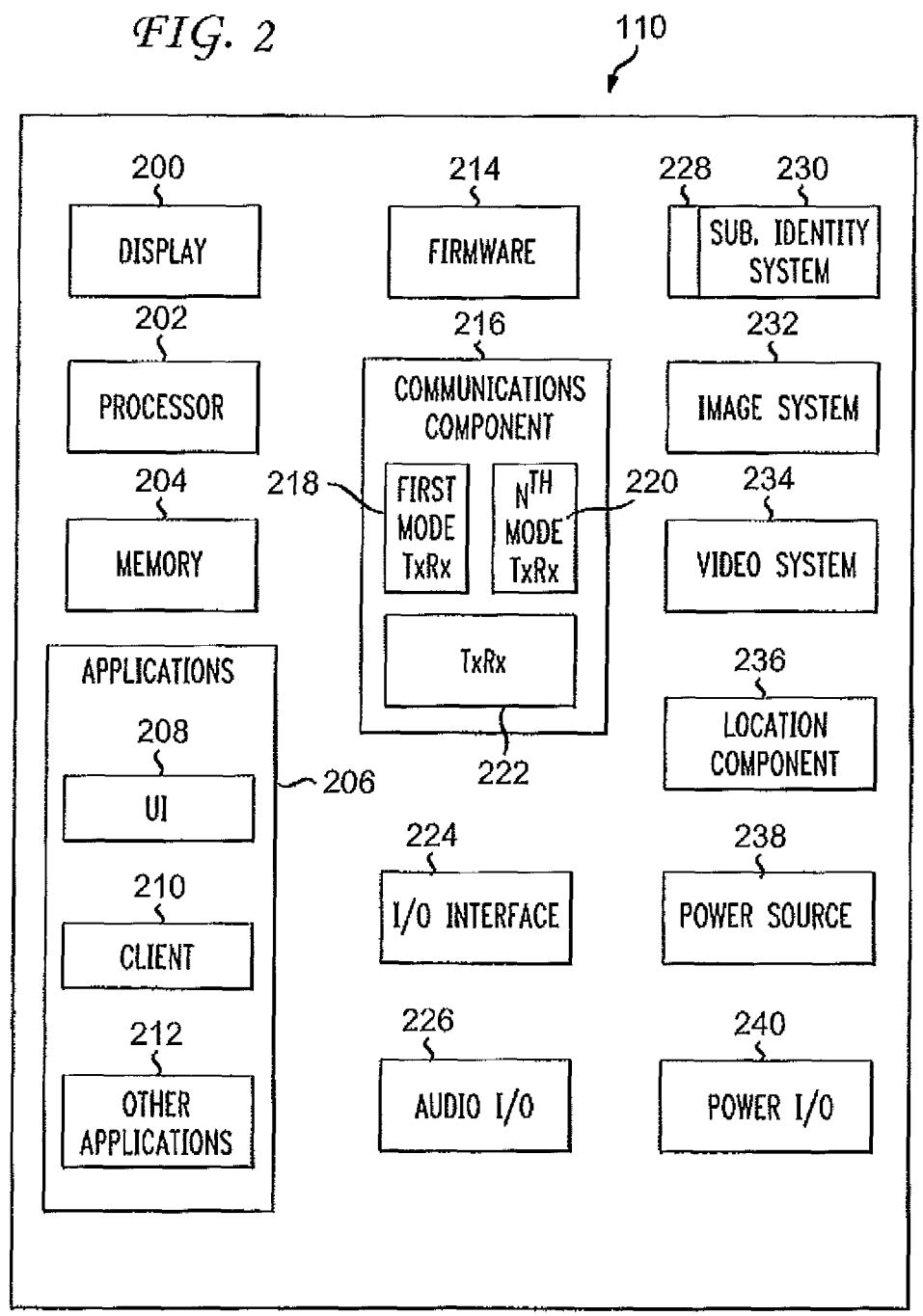
FIG. 2 illustrates an exemplary device for tagging a recorded event according to an exemplary embodiment.

FIG. 2 illustrates a schematic block diagram of an exemplary device 110 according to exemplary embodiments. Although no connections are shown between the components illustrated in FIG. 2, those skilled in the art will appreciate that the components can interact with each other via any suitable connections to carry out device functions.

It should be understood that FIG. 2 and the following description are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software. The term "application," or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like.

Referring to FIG. 2, a device 110 may be a multimode handset and can include a variety of computer-readable media, including volatile media, non-volatile media, removable media, and non-removable media. The term "computer-readable media" and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the device 110.

The device 110 may include a display 200 for displaying multimedia, such as, for example, text, images, video, and telephone functions, such as Caller ID data, setup functions, menus, music metadata, messages, wallpaper, graphics, Internet content, device status, preference settings, and the like.

The device 110 may include a processor 202 for controlling and/or processing data. A memory 204 can interface with the processor 202 for the storage of data and/or applications 206.

The applications 206 may include, for example, SMS messaging software, EMS message software, MMS messaging software, USSD software, a WAP browser, and the like.

The applications 206 may also include a user interface (UI) application 208. The UI application 208 can interact with a client 210 (e.g., an operating system) to facilitate user interaction with device functionality and data. For example, the UI application 208 may be used for entering message content, viewing received messages, answering/initiating calls, entering/deleting data, password entry and settings, configuring settings, address book manipulation, and the like. Such user interaction may be facilitated via, e.g., a keypad or a touchscreen included in the device 110 or communicating with the device via the I/O interface 224. Also, according to exemplary embodiments, the UI application 208 can be used for initiating a tag and entering information associated with the tag, e.g., by a customer, security person, or other user of the device 110. For example, the user may push a button to initiate a tag and then enter notes regarding the event via keypad. The tag may include a timestamp, generated, e.g., by a timer within the device 110 (not shown), as well as location information obtained via a location component 236 (described below).

The applications 206 may include other applications 212, such as, for example, add-ons, plug-ins, email applications, music application, video applications, camera applications, location-based service (LSB) applications, power conservation applications, game applications, productivity application, entertainment applications, combinations thereof, and the like, as well as subsystem and/or components.

The applications 206 can be stored in the memory and/or in firmware components 214 and can be executed by the processor 202. The firmware 214 can also store code for execution during initialization of the device 110.

A communications component 216 may interface with the processor 202 to facilitate wired/wireless communication with external systems including, for example, cellular networks, location systems, VoIP networks, local area networks (LAN's), wide area networks (WAN's), metropolitan area networks (MAN's), personal area networks (PAN's), and other networks, which may be implemented using WIFI, WIMAX, combinations and improvements thereof, and the like. The communications component 216 can also include a multimode communication subsystem for providing cellular communications via different cellular technologies. For example, a first cellular transceiver 218 can operate in one mode, for example, GSM, and an Nth transceiver 220 can operate in a different mode, for example UMTS. While only two transceivers 218, 220 are illustrated, it should be appreciated that a plurality of transceivers may be included. The communications component 216 may also include a transceiver 222 for other communication technologies, such as, for example, WIFI, WIMAX, BLUETOOTH, infrared, IRDA, NFC, RF, and the like. The communications components 216 may also facilitate reception from terrestrial radio networks, digital satellite radio networks, Internet based radio service networks, combinations thereof, and the like. The communications component 216 can process data from a network, such as, for example, the network 120, the Internet, a corporate network, a home broadband network, a WIFI hotspot, and the like via an ISP, DSL provider, or broadband provider. The communications component 216 can be used to communicate tags and associated information to the tag association server 130, as well as recorded events, via the network 120. Also, the communications component 216 may be used to receive information for review from the tag association server 130.

An input/output (I/O) interface 224 may be provided for input/output of data and/or signals. The I/O interface 224 may be a hardwire connection, such as, far example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combination thereof, and the like. It should be appreciated that the I/O interface 224 can be used for communication between the device and a network or local device instead of, or in addition to, the communications component 216.

Audio capabilities may be provided by an audio I/O component 226 that may include a speaker for the output of audio signals and a microphone to collect audio signals. According to an exemplary embodiment, the audio I/O components 226 may be used to record at least a portion of an event with which a user of the device 110 is concerned.

The device 110 can include a slot interface 228 for accommodating a subscriber identity system 230 such as, for example, a subscriber identity module (SIM) or universal SIM (USIM). The subscriber identity system 230 instead can be manufactured into the device 110, thereby obviating the need for a slot interface 228. In some embodiments, the subscriber identity system 230 can store certain features, user characteristics, rules, policies, models, contact information, and the like. The subscriber identity system 230 can be programmed by a manufacturer, a retailer, a user, a computer, a network operator, and the like.

The device 110 can further include an image capture and processing system 232 (image system). Photos and/or videos can be obtained via an associated image capture subsystem of the image system 232, for example, a camera. The device 110 may also include a video system 234 for capturing, processing, recording, modifying, and or transmitting video content. The image system 232 and the video system 234 may be used to capture at least a portion of an event being tagged by a user of the device 110.

A location component 236 may be included to send and/or receive signals such as, for example, GPS data, A-GPS data, WIF/WIMAX and or cellular network triangulation data, combinations thereof, and the like. The location component 236 can interface with cellular network nodes, telephone lines, and satellites, such as satellites 150, location transmitters, wireless network transmitters and receivers, for example, WIFI hotspots, radio transmitters, combinations thereof and the like. The device 110 may obtain, generate, and/or receive data to identify its location or can transmit data used by other devices to determine the device 110 location. The location of the device 110 can be provided as part of the tag to the tag association server 130 for use in determining a location of a recorded event. In a similar manner the location of recording devices, e.g., camera/microphone 107, may be recorded and provided to the tag association server 130 to pinpoint a location of a recorded event.

The device 110 may also include a power source 238, such as batteries and/or other power subsystems (AC or DC). The power source 238 can interface with an exemplary power system or charging equipment via a power I/O component 240.

According to exemplary embodiments described above, a communication device, such as the communication devices 110A and 110B, is provided with the capability to tag at least a portion of a recorded audio and/or video event to enable quick review or later analysis. This may be used for many purposes, for example, a customer initiated review of a retail transaction occurring (or that has occurred), e.g., at a retail establishment or over the phone or Internet. According to an exemplary embodiment, once an audio/video recording of a retail transaction is in progress, a customer has the ability to initiate a tag to have the recording reviewed, e.g., by management. This helps make the customer service process more transparent and effective. As another example, this event tagging may be used to enhance security monitoring to enable a user to signal for help and ensure an audio and/or video recording is quickly available. According to an exemplary embodiment, a user is provided with a way to indicate that an event involves a security concern in a silent manner, without drawing attention.

As an example of a customer service scenario, consider a customer paying for a product at a retail establishment. At the check-out counter, there may be a sign indicating that the retail establishment utilizes an event tagging service to ensure good customer service. The sign may note that the customer can use a mobile enabled tagging (MET) system to provide feedback regarding customer service, and that use of the MET application will cause a video/audio recording of the retail transaction to be reviewed, e.g., by management, by accessing the tag association server 130. The MET application may be downloaded to the customer's communication device as a free or fee-based application, either at the retail establishment or in advance. The retail establishment may post a code which the customer may enter into the communication device to activate the application to tag the customer service transaction and to enter information regarding the customer service transaction.

According to an exemplary embodiment, the customer's device may include a timer, as described above, to identify a particular time period associated with an event that the customer wishes to tag. The customer's device may also include a location-based application to indicate a location associated with the event that the customer wishes to tag.

To identify the particular entity associated with the event that the customer wishes to tag, e.g., the retail establishment at which the customer transaction is taking place, the retail establishment may also post an organization ID that the customer may enter to identify the particular retail establishment at which the event is being recorded. Alternatively, the customer may select the particular retail establishment from a list of retail establishments in an area in proximity to the customer's device using, e.g., location-based services.

In this manner, if a customer receives poor customer service, then the customer may use the MET application downloaded to his or her communication device to complain and have the issue addressed. Similarly, the customer may use the MET application to provide feedback regarding a retail transaction and/or a product or service. The recorded portion of the event will make it possible to hold employees accountable for customer service and will provide customers with a way of providing immediate feedback as well as proof of an incident via audio/video recording of the incident. Management personnel then have more information at their disposal to deal with a customer service issue.

Although described above with reference to a retail establishment, the MET application may be implemented for retail transactions occurring over, e.g., the phone or Internet. In the phone/Internet scenario, a recorded message may be provided to the customer (e.g., in text, audio, and/or video form) indicating that the MET application may be used to provide feedback regarding customer service, and the recorded message may include the MET code to activate the application.

As an example of a security scenario, a security person at a retail establishment or other location may enter a code, e.g., at a communication device at the retail establishment, to cause a recorded event to be tagged and may then enter information relating to the tagged event. For example, the information may include an alert, e.g., an alarm. A security service (public or private) may review the tagged recorded event by accessing the tag association server 130. Thus, a business or other entity at which an event involving a security concern occurs may react more quickly to respond to the concern, given that audio or video is immediately made available to a security entity. As in the customer service scenario, the security scenario may also apply to transactions or other events occurring over the telephone and/or Internet.

Figure 3:
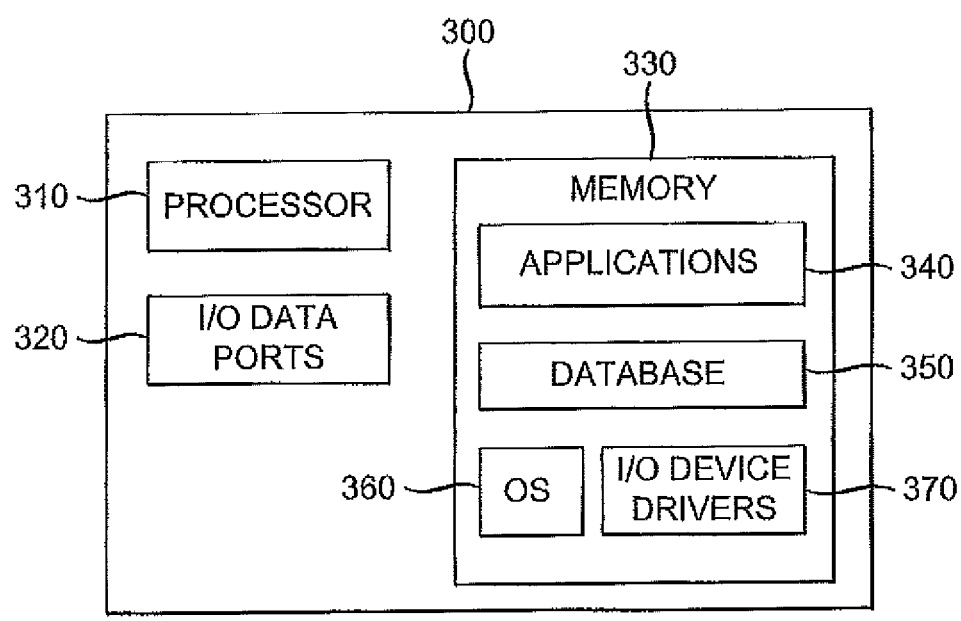
FIG. 3 illustrates an exemplary device for associating a tag with a recorded event according to an exemplary embodiment.

FIG. 3 is a block diagram of a device 300 with which a tag association server 130 may be implemented according to an exemplary embodiment. The device 300 includes a processor 310 that receives information, such as information including tags and additional information related to recorded events, received from communication devices 110A and 110B and event recordings received from the communication devices 110A and 110B and/or camera/microphone 107 via I/O data ports 320. Information including tagged recorded event portions and information associated with the tagged recorded event portions may also be presented to, e.g., the communication device 140 via the I/O data ports 320. The I/O data ports 320 can be implemented with, e.g., an interface including an antenna or other suitable type of transceiver through which data and signals may be transmitted and received.

The processor 310 communicates with a memory 330 via, e.g., an address/data bus (not shown). The processor 310 can be any commercially available or customer processor. The memory 330 is representative of the overall hierarchy of memory devices containing the software and data used to implement the functionality of the device 300. The memory 330 can include, but is not limited to, the following types of devices: processor registers, processor cache, RAM, ROM, PROM, EPROM, EEPROM, flash memory, SRAMD, DRAM, other volatile memory forms, and non-volatile, semi-permanent or permanent memory types; for example, tape-based media, optical media, solid state media, hard disks, combinations thereof, and the like.

As shown in FIG. 3, the memory 330 may include several categories of software and data used in the device 300, including, applications 340, a database 350, an operating system (OS) 360, and the input/output (I/O) device drivers 370. As will be appreciated by those skilled in the art, the OS 360 may be any operating system for use with a data processing system. The I/O device drivers 370 may include various routines accessed through the OS 360 by the applications 340 to communicate with devices, and certain memory components. The applications 340 can be stored in the memory 330 and/or in a firmware (not shown) as executable instructions, and can be executed by the processor 310. The applications 340 include one or various programs that, when executed by the processor 310, implement the various features of the device 300, including matching tags with particular portions of recorded events and presenting the portions of the recorded events corresponding to the matched tags for review, along with additional information associated with the recorded events. The applications 340 may be applied to data stored in the database 350, along with data, e.g., received via the I/O data ports 320. The database 350 represents the static and dynamic data used by the applications 340, the OS 360, the I/O device drivers 370 and other software programs that may reside in the memory.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like. Thus, any of the data, applications, and/or software described above can be stored within the memory 330 and/or accessed via network connections to other data processing systems (not shown) that may include a local area network (LAN), a metropolitan area network (MAN), or a wide area network (WAN), for example.

It should be understood that FIG. 3 and the description above are intended to provide a brief, general description of a suitable environment in which the various aspects of some embodiments of the present disclosure can be implemented. While the description refers to computer-readable instructions, embodiments of the present disclosure also can be implemented in combination with other program modules and/or as a combination of hardware and software in addition to, or in stead of, computer readable instructions. As described above with reference to FIG. 2, the term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

FIG. 4 illustrates a method for associating a tag with a recorded event according to an exemplary embodiment. It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

Referring to FIG. 4, a recording of an event is received, e.g., from a camera/microphone 107, at the tag association server 130 at step 410. A tag associated with the event is received at step 420. For example, the tag may be associated with one or more of a particular entity associated with an event entity, a particular time period associated with the event duration, and a particular location associated with the event. The tag is received, e.g., from the communication devices 110A and/or 110B, at the tag association server 130. The tag is received responsive to interactions by a user, e.g., users 102 and/or 108, with communication devices 110A and/or 110B, respectively. At step 430, additional information associated with the recorded event is received, e.g., from the communication devices 110A and/or 110B at the tag association server 130. At step 440, the tag is matched with at least a portion of the event recording based on at least one of the particular entity, the particular time period, and the particular location associated with the received tag. At step 450, the portion of the recorded event matching the received tag is presented for review, along with the additional information associated with the recorded event, by the tag association server 130. The portion of the recorded event and the additional information may be presented for review, e.g., to a user of a communication device 140.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:
1. A method comprising:
receiving, by a system comprising a processor via a network, a recording of an event from a surveillance device of an event entity, wherein the event occurs over an event duration at the event entity, wherein the surveillance device of the event entity is located within an environment associated with the event entity, and wherein the surveillance device generates the recording of the event;

receiving, by the system via the network, from a first communication device associated with a user, a tag comprising tag data, wherein the tag is generated by the first communication device in response to interaction by the user with the first communication device, wherein the interaction by the user with the first communication device causes the first communication device to generate, by a timer within the first communication device, a timestamp and further causes the first communication device to generate, based on data received via a location component of the first communication device from at least one satellite, location information corresponding to a location of the first communication device, wherein the tag data comprises the timestamp generated by the timer within the first communication device and the location information generated based on the data received via the location component of the first communication device from the at least one satellite, and wherein the surveillance device is a stand-alone device separate from the first communication device;

receiving, by the system via the network, from the first communication device, user-input information related to the event, wherein the user-input information is input by the user at the first communication device;

associating, by the system, the tag received from the first communication device with a portion of the recording of the event received from the surveillance device, wherein associating the tag with the portion of the recording of the event is based, at least in part, on determining that the timestamp of the tag is associated with the event duration of the event;

facilitating, by the system, access to the portion of the recording of the event associated with the tag and to the user-input information; and in response to associating the tag received from the first communication device with the portion of the recording of the event received from the surveillance device, providing, by the system via the network, the portion of the recording of the event associated with the tag along with the user-input information to a second communication device.

2. The method of claim 1, wherein the tag data further comprises an entity identifier for the event entity at which the event is recorded.

3. The method of claim 1, wherein the first communication device is a mobile communication device and the user-input information is received from the mobile communication device.

4. The method of claim 1, wherein:
the event is one of a commercial event or a security event; and
the user-input information comprises one of user feedback related to the commercial event or an alert related to the security event.

5. The method of claim 1, wherein the user-input information is part of the tag received.

6. The method of claim 1, wherein the event comprises an activity selected from a group consisting of an in-person activity at the event entity associated with the event, a user-entity telephone communication involving the event entity associated with the event, and a user-entity over-the-internet communication involving the event entity associated with the event.

7. The method of claim 1, wherein determining that the timestamp of the tag is associated with the event duration of the event comprises determining that the event duration comprises an amount of time before and after the timestamp of the tag.

8. The method of claim 1, wherein the first communication device and the second communication device are mobile communication devices.

9. The method of claim 1, further comprising receiving location information associated with the surveillance device.

10. A system comprising:
a processor; and
a computer-readable storage device comprising instructions that, when executed by the processor, cause the processor to perform operations comprising:

receiving, via a network, a recording of an event from a surveillance device of an event entity, wherein the event occurs over an event duration at the event entity, wherein the surveillance device of the event entity is located within an environment of the event entity, and wherein the surveillance device generates the recording of the event, receiving, via the network from a first communication device associated with a user, a tag comprising tag data, wherein the tag is generated by the first communication device in response to interaction by the user with the first communication device, wherein the interaction by the user with the first communication device causes the first communication device to generate, by a timer within the first communication device, a timestamp and further causes the first communication device to generate, based on data received via a location component of the first communication device from at least one satellite, location information corresponding to a location of the first communication device, wherein the tag data comprises the timestamp generated by the timer within the first communication device and the location information generated based on the data received via the location component of the first communication device from the at least one satellite, and wherein the surveillance device is a stand-alone device separate from the first communication device, receiving, via the network from the first communication device, user-input information related to the event, wherein the user-input information is input by the user at the first communication device, associating the tag received from the first communication device with a portion of the recording of the event received from the surveillance device, wherein associating the tag with the portion of the recording of the event is based, at least in part, on determining that the timestamp of the tag is associated with the event duration of the event, facilitating access to the portion of the recording of the event and to the user-input information, and in response to associating the tag received from the first communication device with the portion of the recording of the event received from the surveillance device, providing, via the network, the portion of the recording of the event associated with the tag along with the user-input information to a second communication device.

11. The system of claim 10, wherein the operations further comprise receiving location information associated with the surveillance device.

12. The system of claim 10, wherein the tag data further comprises an entity identifier for the event entity at which the event is recorded.

13. The system of claim 10, wherein:
the event is one of a commercial event or a security event; and
the user-input information comprises one of user feedback related to the commercial event or an alert related to the security event.

14. The system of claim 10, wherein the user-input information is part of the tag received.

15. The system of claim 10, wherein the event comprises an activity selected from a group consisting of an in-person activity at the event entity associated with the event, a user-entity telephone communication involving the event entity associated with the event, and a user-entity over-the-internet communication involving the event entity associated with the event.

16. A non-transitory computer-readable storage device comprising instructions that, when executed by a processor of a system, cause the processor to perform operations comprising:
receiving, via a network, a recording of an event from a surveillance device of an event entity, wherein the event occurs over an event duration at the event entity, wherein the surveillance device of the event entity is located within an environment associated with the event entity, and wherein the surveillance device generates the recording of the event;
receiving, via the network from a first communication device associated with a user, a tag comprising tag data, wherein the tag is generated by the first communication device in response to interaction by the user with the first communication device, wherein the interaction by the user with the first communication device causes the first communication device to generate, by a timer within the first communication device, a timestamp and further causes the first communication device to generate based on data received, via a location component of the first communication device from at least one satellite, location information corresponding to a location of the first communication device, wherein the tag data comprises the timestamp generated by the timer within the first communication device and the location information generated based on the data received via the location component of the first communication device from the at least one satellite, and wherein the surveillance device is a stand-alone device separate from the first communication device;
receiving, via the network from the first communication device, user-input information related to the event, wherein the user-input information is input by the user at the first communication device;
associating the tag received from the first communication device with a portion of the recording of the event received from the surveillance device, wherein associating the tag with the portion of the recording of the event is based, at least in part, on determining that the timestamp of the tag is associated with the event duration of the event;
facilitating access to the portion of the recording of the event and to the user-input information; and
in response to associating the tag received from the first communication device with the portion of the recording of the event received from the surveillance device, providing, via the network, the portion of the recording of the event associated with the tag to be presented along with the user-input information to a second communication device.

17. The non-transitory computer-readable storage device of claim 16, wherein the operations further comprise receiving location information associated with the surveillance device.

18. The non-transitory computer-readable storage device of claim 16, wherein the tag data further comprises an entity identifier for the event entity at which the event is recorded.

19. The non-transitory computer-readable storage device of claim 16, wherein the event comprises an activity selected from a group consisting of an in-person activity at the event entity associated with the event, a user-entity telephone communication involving the event entity associated with the event, and a user-entity over-the-internet communication involving the event entity associated with the event.

* * * * *